United States Patent [19]
Beutin et al.

[11] Patent Number: 5,615,547
[45] Date of Patent: Apr. 1, 1997

[54] SYSTEM FOR REGULATING OIL AND FUEL TEMPERATURES OF A TURBOJET ENGINE

[75] Inventors: Bruno A. Beutin, Corbeil Essonnes; Joël Creti, Ussy/Marne; Jean-Pierre Donnadieu, Longueville; Francis G. A. Garnier, Bombon; Michel G. Hugues, Bois Le Roi; Jean-Loïc H. Lecordix, Vaux Le Penil; Claude P. H. Maignan, Savigny Le Temple; Gilles C. G. Massot, Voisenon; Jean-Marie N. Pincemin, Crosne; Christophe J. F. Thorel, Paris; Carole C. Touron, Bondoufle; Gérard M. R. M. Vennin, Cesson, all of France

[73] Assignee: Societe Nationale D'Etude et de Construction de Moteurs D'Aviation S.N.E.C.M.A., Paris Cedex, France

[21] Appl. No.: 582,613

[22] Filed: Jan. 3, 1996

[30] Foreign Application Priority Data

Jan. 4, 1995 [FR] France ................................. 95 00031

[51] Int. Cl.$^6$ ........................... F02C 7/06; F02C 7/224
[52] U.S. Cl. ....................... 60/39.08; 60/39.83; 60/736
[58] Field of Search .................... 60/39.08, 39.33, 60/39.83, 736; 184/6.11

[56] References Cited

U.S. PATENT DOCUMENTS

| | | | |
|---|---|---|---|
| 4,474,001 | 10/1984 | Griffin et al. | 60/39.83 |
| 4,705,100 | 11/1987 | Black et al. | 60/39.83 |
| 5,105,875 | 4/1992 | McArthur | 60/39.83 |
| 5,438,823 | 8/1995 | Loxley et al. | 60/39.08 |

*Primary Examiner*—Louis J. Casaregola
*Attorney, Agent, or Firm*—Bacon & Thomas

[57] ABSTRACT

A system is disclosed for regulating oil and fuel temperatures in a turbojet engine having an engine accessory driven at constant speed by a power transmission which is driven by the turbojet engine. The system has a first closed oil circuit for circulating oil through the turbojet engine, a second closed oil circuit for circulating oil through the power transmission, a fuel circuit for supplying fuel to the turbojet engine, an air/oil heat exchanger connected to the first closed oil circuit to pass oil in heat exchange relationship with air, an oil/fuel heat exchanger connected to the fuel circuit and to the first closed oil circuit downstream of the air/oil heat exchanger to pass oil and fuel in heat exchange relationship, and an oil/oil heat exchanger connected to the first and second closed oil circuits to pass oil in heat exchange relationship, the connection to the first closed oil circuit being downstream of the oil/fuel heat exchanger.

7 Claims, 1 Drawing Sheet

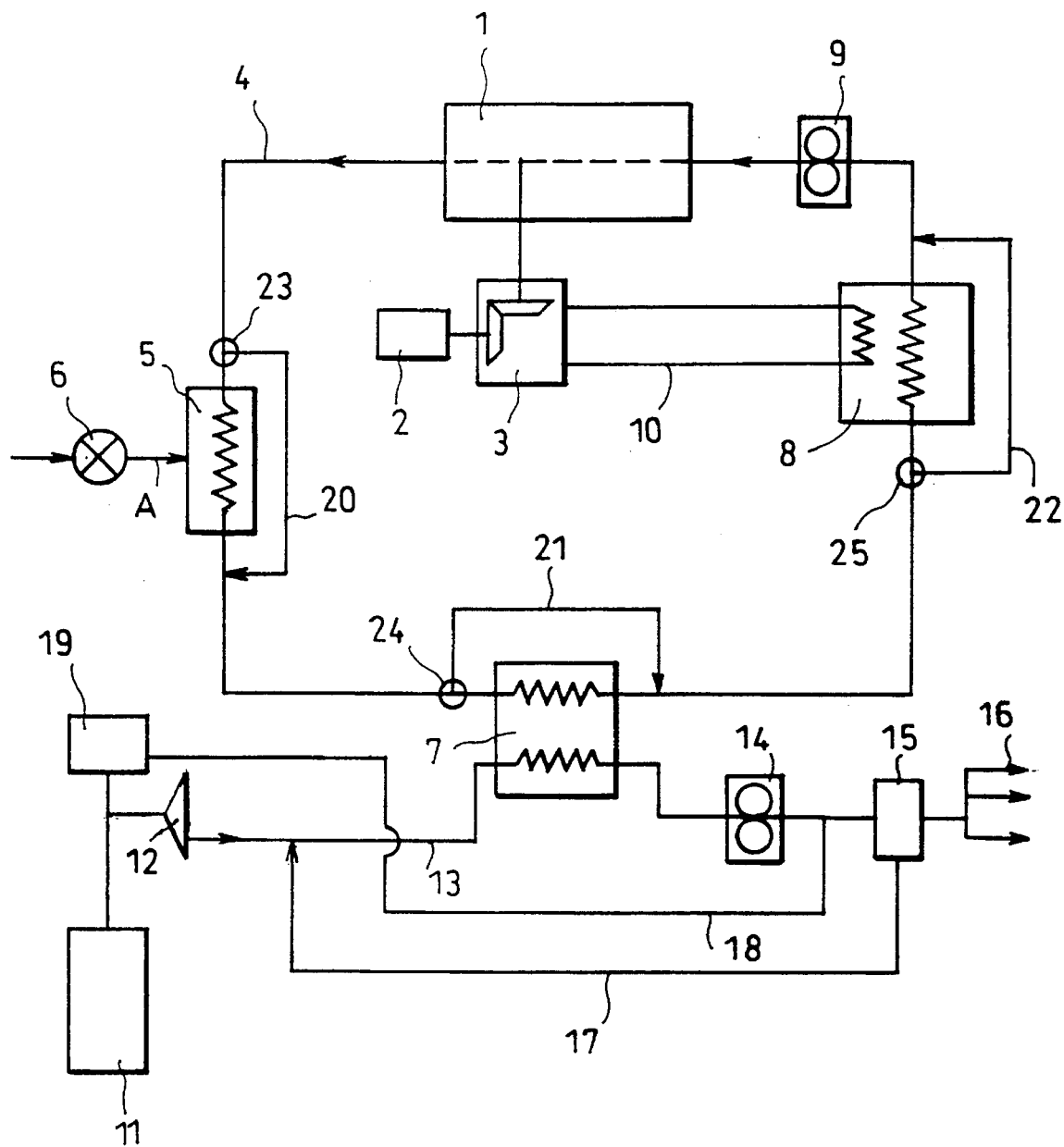

SYSTEM FOR REGULATING OIL AND FUEL TEMPERATURES OF A TURBOJET ENGINE

BACKGROUND OF THE INVENTION

The present invention relates to a system for regulating the oil and fuel temperatures of an aircraft turbojet engine by controlling the heat exchange between the oil and the fuel of the engine. More specifically, the invention concerns a temperature regulating system for a turbojet engine fitted with an alternator which is mechanically driven at constant speed through a power transmission driven by a rotating part of the turbojet engine.

Today's turbojet engines typically comprise two separate oil circuits, namely a first closed oil circuit to circulate and cool lubricating oil which lubricates the internal turbojet engine structures, such as bearings, and a second closed oil circuit to circulate and cool oil that lubricates the alternator drive means. Fuel flow feeding the fuel injectors of the turbojet engine is supplied from a fuel circuit drawing fresh fuel from the fuel tanks, typically located in the wings of the aircraft. To facilitate combustion, the fuel is heated in the fuel circuit to an elevated temperature having an upper limit which must not be exceeded in order to preclude partial fuel vaporization, or decomposition, which would cause engine fuel pumps and fuel regulators to malfunction.

The amount of fuel flowing into the turbojet engine depends upon the demands placed upon the engine by the command pilot. The oil flowing in the first closed oil circuit depends upon the rotational speed of the turbojet engine and the heat carried by this oil depends upon the turbojet engine load. Because the alternator is driven at a constant speed, the oil flow through the second oil circuit is substantially constant and the heat carried by this oil depends upon the aircraft power drain and on the heat dissipated by the integrated mechanical transmission connecting the alternator to the driving part of the turbojet engine. Such mechanical transmissions dissipate large quantities of heat even when the moving parts are rotating slowly. The thermal energy dissipated in the second oil circuit is between 5–15% of that dissipated in the first oil circuit during full power engine operation and may rise to 50% under engine idling conditions.

Present research into the designs of high bypass ratio fan jet engines include the use of rotational speed reducers to reduce the rotational speed of the fan driven by the turbojet engine. This research applies also to turboprop engines regarding the mechanical linkage between the engine and the propeller. Such speed reducers transmit high power and, accordingly, the heating of the speed reducer components assumes great design significance. Effective cooling of the oil in the first closed oil circuit must be achieved to maintain permissible engine temperature levels. In a speed reducer equipped engine, the thermal power to be dissipated is approximately twice as large as that to be dissipated in a conventional turbojet engine. This heat is now removed by using a high oil flow through the first closed circuit.

It is known to cool the oil passing through the first oil circuit by using an oil/fuel heat exchanger in which the heat from the oil is transferred to the fuel which is then supplied to the turbojet engine. The fuel temperature may not exceed 150° C. in order to avoid the previously mentioned component malfunctions. Because of the high efficiency of turbojet engines with speed reducers and high bypass ratios, neither the fuel flow into the engine, nor the lubricating oil passing through the first closed oil circuit is sufficient to remove the heat generated in the alternator power transmission.

It has been proposed to remove the heat generated by the alternator power transmission using a special heat exchange fuel circuit and returning the heated fuel to the tanks in the aircraft wing with the wing surface assuming the function of a fuel/air heat exchanger. This suggestion does not solve the problem when the aircraft is operated in hot climates in which the fuel in the wings will overheat if the aircraft spends too much time on the ground awaiting takeoff when the engines are running. In such cases, it is necessary to stop the engines, drain the overheated fuel and replace it with fresh fuel. Conversely, in a cold operating environments, starting the engines fitted with speed reducers is also a problem because the oil may be less viscous and, under extreme conditions, congealed.

The state of the art is illustrated by U.S. Pat. Nos. 4,151,710; 4,741,152; 5,121,598; and 5,253,470. U.S. Pat. No. 4,151,710 describes an oil cooling system for turbojet engines in which the lubrication oil for the alternator drive transmission is cooled by a second air/oil heat exchanger connected in series with the previously mentioned oil/fuel heat exchanger and located downstream in the direction of fuel flow through the heat exchanger. In aircraft descent phases, the fuel which was heated by its recirculation, is cooled by the oil of the second closed oil circuit in the second heat exchanger, necessitating the use of an air/oil heat exchanger in the second closed oil circuit.

U.S. Pat. No. 4,741,152 utilizes two lubrication circuits, each comprising an air/oil and an oil/fuel heat exchanger. The oil/fuel heat exchanger of the cooling circuit for the alternator drive transmission is located upstream of the oil/fuel heat exchanger in the fuel circuit.

The systems noted in the aforementioned U.S. patents do not allow heating the oil of the first closed oil circuit by means of the oil in the second closed oil circuit when the turbojet engine is started in cold operating conditions.

U.S. Pat. No. 5,121,598 discloses cooling equipment for the lubrication oil of the alternator drive transmission which comprises an oil/fuel heat exchanger in an oil return circuit which returns the fuel to the wing tanks. U.S. Pat. No. 5,253,470 discloses an oil heating system using the heat generated by the engine starter.

SUMMARY OF THE INVENTION

A system is disclosed for regulating oil and fuel temperatures in a turbojet engine having an engine accessory driven at constant speed by a power transmission which is driven by the turbojet engine. The system has a first closed oil circuit for circulating oil through the turbojet engine, a second closed oil circuit for circulating oil through the power transmission, a fuel circuit for supplying fuel to the turbojet engine, an air/oil heat exchanger connected to the first closed oil circuit to pass oil in heat exchange relationship with air, an oil/fuel heat exchanger connected to the fuel circuit and to the first closed oil circuit downstream of the air/oil heat exchanger to pass oil and fuel in heat exchange relationship, and an oil/oil heat exchanger connected to the first and second closed oil circuits to pass oil in heat exchange relationship, the connection to the first closed oil circuit being downstream of the oil/fuel heat exchanger.

Bypass conduits are connected to the first oil circuit around each of the heat exchangers and are controlled by valves which control the amount of oil passing through each of the respective heat exchangers to accurately control the temperatures of the oil and fuel under all operating conditions.

The system of the present invention provides a temperature regulation system for a turbojet engine which obviates the aforementioned drawbacks and which, in particular, allows starting of the turbojet engine in cold weather, avoids fuel heating in the wings of the aircraft when the turbojet engine is running on the ground in hot weather and sufficiently heats the fuel when flying at high altitudes.

In the present system, the lubrication oil of the alternator drive transmission heats the oil in the first closed circuit under all flight conditions and, in particular, when starting in cold weather. Since this heat exchanger is an oil/oil heat exchanger, the danger of contaminating the oil in the closed circuits by a different fluid in case of heat exchanger leakage is not present. The heat generated by the alternator drive transmission is not dissipated into the fuel contained in the aircraft wing tanks thereby eliminating the drawbacks of such wing fuel heating during excessive ground weights for takeoff in hot operating conditions. The heat available in the engine lubricating oil is increased by the supplemental heat provided from the oil of the alternator drive transmission. In flight at high altitudes, the available heat of the engine lubricating oil passing through the first closed oil conduit becomes sufficient to heat the cold fuel. The different between the cold fuel temperature and the temperature of the oil circulating in the first closed circuit is increased under all flight conditions, and thereby, the heat exchange between the oil and the fuel is improved, making possible a more compact oil/fuel heat exchanger.

BRIEF DESCRIPTION OF THE DRAWING

The single drawing shows a schematic diagram of the system of the present invention.

DETAILED DESCRIPTION OF THE PREFERRED EMBODIMENT

The drawing illustrates a turbojet engine 1 having a rotational dement which drives an alternator 2 at a constant speed by means of a mechanical transmission 3. The heat generated in the turbojet engine 1 is transferred to oil passing through a first closed oil circuit 4 having, as seen in the direction of the oil flow indicated by the arrows, an air/oil heat exchanger 5 through which also circulates cooling air A drawn from a cold air flow through a controllable flap 6, an oil/fuel heat exchanger 7, an oil/oil heat exchanger 8 and an oil pump 9 driven by the turbojet engine 1.

The lubrication oil of the mechanical transmission 3, which drives the alternator 2, circulates in a second closed oil circuit 10 which also passes through the oil/oil heat exchanger 8 wherein the oil circulating in the second closed oil circuit 10 is cooled by heating the oil in the first closed oil circuit 4.

Fuel is drawn from the fuel tank 11 inside the aircraft wing by a booster pump 12 and then passes via the fuel circuit 13, through the heat exchanger 7, a high pressure pump 14 and a fuel flow regulator 15. The fuel flow regulator feeds fuel to the turbojet engine fuel injectors 16, with the amount of fuel supplied varying in response to the engine operating conditions. Any unused fuel is recirculated through the fuel flow circuit 13 via a recirculation circuit 17. A conduit 18 draws a portion of the high pressure fuel from the fuel circuit 13 between the high pressure pump 14 and the fuel flow regulator 15 to supply the engine hydraulic controls and actuators 19.

The first closed oil circuit 4 also comprises bypass conduits 20, 21 and 22 which bypass each of the heat exchangers 5, 7 and 8, respectively. In order to control the oil flow passing through the bypass conduits, valves 23, 24 and 25 are provided in the bypass conduits, which valves are controlled by an appropriate control system as a function of flight conditions, the temperatures of the various fluids and of predetermined set points. Obviously, controlling the oil which flows through the bypass conduits will also control the amount of oil passing through each of the heat exchanger 5, 7 and 8.

When starting the engine in cold weather, valves 23 and 25 are placed in such positions that oil circulating through the first closed oil circuit passes through the bypass conduit 20 and through the oil/oil heat exchanger 8, thereby making it possible to heat the oil fed to the engine by the oil pump 9 with the heat transferred from the oil in the second closed oil circuit 10.

The foregoing description is provided for illustrative purposes only and should not be construed as in any way limiting this invention, the scope of which is defined solely by the appended claims.

We claim:

1. A system for regulating oil and fuel temperatures in a turbojet engine having an engine accessory driven at constant speed by a power transmission driven by the turbojet engine, comprising:
   a) a first closed oil circuit for circulating oil through the turbojet engine;
   b) a second closed oil circuit for circulating oil through the power transmission;
   c) a fuel circuit for supplying fuel to the turbojet engine;
   d) an air/oil heat exchanger connected to the first closed oil circuit to pass oil therethrough in heat exchange relationship with air;
   e) an oil/fuel heat exchanger connected to the fuel circuit and the first closed oil circuit, downstream of the air/oil heat exchanger in the direction of flow of oil in the first closed oil circuit, to pass oil and fuel therethrough in heat exchange relationship; and,
   f) an oil/oil heat exchanger connected to the first and second closed oil circuits to pass oil in the first and second circuits therethrough in heat exchange relationship, the connection to the first closed oil circuit being downstream of the oil/fuel heat exchanger in the direction of oil flow in the first circuit.

2. The system of claim 1 further comprising a first bypass conduit connected to the first closed oil circuit so as to enable oil in the first closed oil conduit to bypass the air/oil heat exchanger.

3. The system of claim 2 further comprising a first valve connected to the first bypass conduit so as to control the oil flow through the first bypass.

4. The system of claim 1 further comprising a bypass conduit connected to the first closed oil circuit so as to enable oil in the first closed oil circuit to bypass the oil/fuel heat exchanger.

5. The system of claim 4 further comprising a valve connected to the bypass conduit so as to control the oil flow through the bypass.

6. The system of claim 1 further comprising a bypass conduit connected to the first, closed oil circuit so as to enable oil in the first, closed oil circuit to bypass the oil/oil heat exchanger.

7. The system of claim 6 further comprising a valve connected to the bypass conduit so as to control the oil flow through the bypass.

* * * * *